United States Patent
May

(10) Patent No.: US 7,259,480 B2
(45) Date of Patent: Aug. 21, 2007

(54) CONSERVING POWER OF A SYSTEM ON A CHIP USING AN ALTERNATE POWER SOURCE

(75) Inventor: Marcus W. May, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 446 days.

(21) Appl. No.: 10/607,948

(22) Filed: Jun. 27, 2003

(65) Prior Publication Data

US 2004/0113497 A1    Jun. 17, 2004

Related U.S. Application Data

(60) Provisional application No. 60/429,941, filed on Nov. 29, 2002.

(51) Int. Cl.
*H02J 1/00* (2006.01)
(52) U.S. Cl. ........................................ 307/82
(58) Field of Classification Search ................... 307/82
See application file for complete search history.

(56) References Cited

U.S. PATENT DOCUMENTS 5,579,197 A * 11/1996 Mengelt et al. ............ 361/93.4
5,650,669 A * 7/1997 Aldous ........................ 307/66
5,768,115 A * 6/1998 Pascucci et al. ............. 363/59
2002/0065618 A1* 5/2002 Oh ............................. 702/57

* cited by examiner

*Primary Examiner*—Chau N. Nguyen
*Assistant Examiner*—Dru Parries
(74) *Attorney, Agent, or Firm*—Garlick Harrison & Markison; Timothy W. Markison; Bruce E. Stuckman

(57) ABSTRACT

A method for conversing battery power for a battery-optimized system-on-a-chip begins by sensing for presence of an alternate power source. The processing continues, when the presence of the alternate power source is detected, a first control loop of a first DC-to-DC converter is disabled and a second control loop of a second DC-to-DC converter is enabled to produce a supply voltage for the system-on-a-chip. The first DC-to-DC converter, when enabled, converts a battery voltage into a supply voltage and the second DC-to-DC converter, when enabled, converts voltage from the alternate power source into the supply voltage.

16 Claims, 4 Drawing Sheets multiple function battery operated device 60

DC-to-DC converter 26

DC-to-DC converter 26

CONSERVING POWER OF A SYSTEM ON A CHIP USING AN ALTERNATE POWER SOURCE

CROSS REFERENCE TO RELATED PATENTS

This patent is claiming priority under 35 USC § 119(e) to provisionally filed patent application entitled MULTI-FUNCTION HANDHELD DEVICE, having a provisional Ser. No. 60/429,941 and a provisional filing date of Nov. 29, 2002.

BACKGROUND OF THE INVENTION

1. Technical Field of the Invention

This invention relates generally to portable electronic equipment and more particularly to a multi-function handheld device and a battery-optimized system-on-a-chip used therein.

2. Description of Related Art

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc. Each of these handheld devices includes one or more integrated circuits to provide the functionality of the device. For example, a thumb drive may include an integrated circuit for interfacing with a computer (e.g., personal computer, laptop, server, workstation, etc.) via one of the ports of the computer (e.g., Universal Serial Bus, parallel port, etc.) and at least one other memory integrated circuit (e.g., flash memory). As such, when the thumb drive is coupled to a computer, data can be read from and written to the memory of the thumb drive. Accordingly, a user may store personalized information (e.g., presentations, Internet access account information, etc.) on his/her thumb drive and use any computer to access the information.

As another example, an MP3 player may include multiple integrated circuits to support the storage and playback of, digitally formatted audio (i.e., formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible.

Integrated circuits have enabled the creation of a plethora of handheld devices, however, to be "wired" in today's electronic world, a person needs to posses multiple handheld devices. For example, one may own a cellular telephone for cellular telephone service, a PDA for scheduling, address book, etc., one or more thumb drives for extended memory functionality, an MP3 player for storage and/or playback of digitally recorded music, a radio, etc. Thus, even though a single handheld device may be relatively small, carrying multiple handheld devices on one's person can become quite burdensome.

Further, such handheld devices use a battery (or batteries) to supply power to the circuitry of the device when in operation. As a result, battery lifetime is often an important metric used by customers when selecting a handheld device. Therefore, it is important to minimize power consumption from the battery and thus maximize battery life. There are several techniques used to minimize power consumption including using an alternate power source, when available, to power the handheld device so that the energy stored in the battery is consumed only when an alternate power source is not present. Typically, this use of an alternate power source requires external components and/or reduces efficiency by adding additional components to switch the source of the power to a single dc-dc converter. These consequences are not desirable because they increase system cost and reduce performance. Therefore, the need exists for an integrated circuit that is able to select an alternate power source without impacting the efficiency of the primary dc-dc converter and without requiring external components.

Yet further, many handheld devices include an external memory interface to couple to external memory, such as a memory stick, flash memory, etc. The memory interface typically includes a state machine that is programmed to process the reading to and writing from the external memory in accordance with a standardized memory access protocol. As is known, many external memory devices use a standardized memory access protocol, however, recently some manufacturers have deviating from the standardized memory access protocol. The non-standard external memories offer some advantages over the standardized memories, thus are desirable for use with the handheld devices. However, the memory interface state machine is not capable of processing the memory access requests for non-standard memory. Thus, a handheld device would require multiple state machines to process memory access requests with standard and non-standard memories.

Therefore, a need exists for an integrated circuit that provides multiple functions for handheld devices with optimized power consumption and with a minimal requirement of external components.

BRIEF SUMMARY OF THE INVENTION

The conserving power of a system-on-a-chip using an alternate power source of the present invention substantially meets these needs and others. In one embodiment, a method for conserving battery power for a battery-optimized system-on-a-chip begins by sensing for presence of an alternate power source. The processing continues, when the presence of the alternate power source is detected, first control loop of a first DC-to-DC converter is disabled and a second control loop of a second DC-to-DC converter is enabled to produce a supply voltage for the system-on-a-chip. The first DC-to-DC converter, when enabled, converts a battery voltage into a supply voltage and the second DC-to-DC converter, when enabled, converts voltage from the alternate power source into the supply voltage. Thus, by using an alternate power source, which may be provided by a USB connection, to produce the supply voltage for the system-on-a-chip as opposed to the battery, the battery power is conserved.

In another embodiment, an optimized battery usage circuit for a comprehensive system-on-a-chip includes a first and second DC-to-DC converter. The first DC-to-DC converter is operable to convert a battery voltage into a supply voltage when an alternate power source is not coupled to the comprehensive system-on-a-chip. The second DC-to-DC converter is operable to convert an alternate power source voltage into the supply voltage when the alternate power source is coupled to the comprehensive system-on-a-chip. By using an alternate power source, which may be provided by a USB connection, to produce the supply voltage for the system-on-a-chip as opposed to the battery, the battery power is conserved.

DETAILED DESCRIPTION OF THE INVENTION

Figure 1:
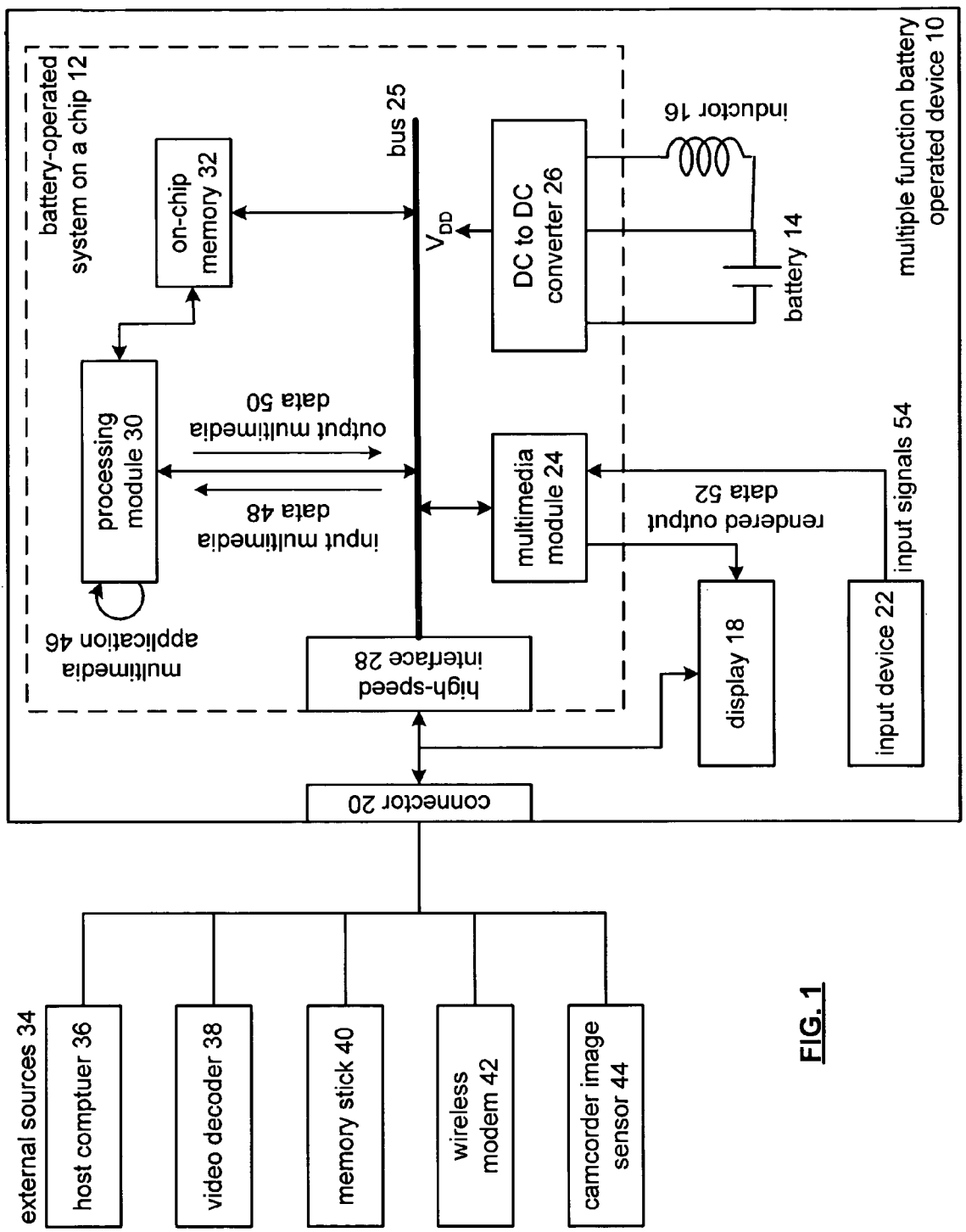
FIG. 1 is a schematic block diagram of a multiple function battery operated device that includes a battery-optimized system-on-a-chip in accordance with the present invention.

FIG. 1 is a schematic block diagram of a multiple function battery operated device 10 that includes a battery-optimized system-on-a-chip 12, a battery 14, an inductor 16, a display 18, a connector 20, and an input device 22. The connector 20 provides coupling between the battery-optimized system-on-a-chip 12 and an external source 34, which may be a host computer 36, a video decoder 38, a memory stick 40, a wireless modem 42, a camcorder image sensor 44. The battery-optimized system-on-a-chip 12 includes a multimedia module 24, a high speed interface 28, a processing module 30, on-chip memory 32, and an on-chip DC-to-DC converter 26. In general, the multiple function battery operated device 10 may be, but is not limited to, an MP3 player/recorder, a thumb drive memory extension, a digital camera, a digital camcorder, a DVD player/recorder, video conferencing device, a personal digital assistant (PDA), a radio, a television, and/or a CD player/recorder.

The DC-to-DC converter 26 is operably coupled to the battery 14 and inductor 16 to produce at least one supply voltage ($V_{DD}$). In general, the DC-to-DC converter may be a buck converter, a boost converter, a fly-back converter, a half bridge converter, and/or a full bridge converter. In one embodiment, the DC-to-DC converter is a boost converter that includes a sink transistor, at least one load transistor, and regulation circuitry. The regulation circuitry monitors the supply voltage ($V_{DD}$) with respect to a reference voltage and produces therefrom a regulation signal. The regulation signal, in one phase, enables the sink transistor to build up energy in the inductor and, in another phase, enables the load transistor to transfer the energy of the inductor to the supply voltage. The DC-to-DC converter 26 will be described in greater detail with reference to FIGS. 3-5.

The high-speed interface 28 is operably coupled to bus 25 within the system-on-a-chip 12 and externally to the connector 20. As such, the high-speed interface 28, which may be a USB (universal serial bus) interface, a serial-to-deserial interface, or parallel interface provides connectivity between one or more external sources 34 and the system-on-a-chip 12. For example, the host computer 36, which may be a personal computer, laptop, workstation, etc., provides digitized audio (e.g., an MP3 file, WMA—Windows Media Architecture—, MP3 PRO, Ogg Vorbis, AAC—Advanced Audio Coding, a CD file, etc.) and/or digitized video signals (e.g., an MPEG (motion picture expert group) file, a JPEG (joint photographic expert group) file, a DVD file, a video graphics file, a text file, etc.) to the high-speed interface 28. The high-speed interface 28 converts the format of the received data into a generic format of the system-on-a-chip, which is based on the type of processing module 30 and/or the type of on-chip memory 32. The high-speed interface then provides the generic formatted data to the processing module 30, the on-chip memory 32, and/or the multimedia module 24.

For instance, the digitalized audio and/or video data may be stored in the on-chip memory 32 for later playback, where the processing module 30 controls the storing of the data via a multimedia application 46. Note that processing module 30 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The on-chip memory 32 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 30 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 32 stores, and the processing module 32 executes, operational instructions corresponding to multimedia applications 46 that include, but are not limited to audio playback, audio record, video playback, video record, storing text, displaying text, storing video graphics, file system transfer, and/or displaying video graphics.

The data that is stored in the on-chip memory 32 may be subsequently retrieved under the control of the processing module 30 while executing a multimedia application 46 to render the data audible and/or visible. In this instance, the processing module 30 causes the data to be retrieved from the on-chip memory 32 and to be provided to the multimedia module 24. The multimedia module 24 processes the data to produce rendered output data 52, which may include analog audio signals, digital audio signals, analog video signals, digital video signals, text, and/or video graphics; and provides the rendered output data 52 to the display 18. The display 18, which may be a headphone jack, a speaker or speakers, an LCD video graphics display, an electro-luminance backlight video graphics display, etc., converts the rendered output data 52 into audible and/or visual information.

In other examples, the high-speed interface 28 may exchange audio data, video data, video graphics data, and/or text data with the video decoder 38, the memory stick 40, the wireless modem 42, and/or the camcorder image sensor 44. As such, the multiple function battery operated device 10 may function as a portable MP3 player/recorder, a personal DVD player/recorder, a personal CD player/recorder, etc.

The multimedia module 24 may also receive input signals 54 from the input device 22, which may be a microphone, a keypad, a video capture device (e.g., a digital camera or a digital camcorder), etc. Such input signals 54 may be video signals, audio signals, video graphics signals, and/or text signals. Upon receiving the input signals 54, the multimedia module 24, in conjunction with the processing module 30 executing a multimedia application, converts the input signals 54 into the generic digital format of the system-on-a- chip for storage in the on-chip memory or for providing to an external source via the high-speed interface 28.

As one of average skill in the art will appreciate, the system-on-a-chip may include a memory interface operably coupled to the bus 25 to coupled to a flash memory, or the like, to extend the memory of the battery operated device 10. As such, in one embodiment, all of the video, video, graphics, text, and/or audio data is stored in the on-chip memory and in another embodiment, the video, video graphics, text, and/or audio data is at least partially stored off-chip in the external memory and retrieved when needed.

As one of average skill in the art will further appreciate, when the handheld device 10 is not coupled to the host device, (i.e., it is in a battery powered mode) the processing module 30 executes a multimedia application 46 to detect the disconnection and to place the handheld device in a battery operation mode. In the battery operation mode, the processing module 30 retrieves, and subsequently executes, a set of operational instructions from the on-chip memory 32 to support the battery operational mode. For example, the battery operational mode may correspond to MP3 file playback, digital dictaphone recording, MPEG file playback, JPEG file playback, text messaging display, cellular telephone functionality, and/or AM/FM radio reception.

As one of average skill in the art will still further appreciate, due to the comprehensiveness of the system-on-a-chip 12, the battery-operated device 10 requires a minimal of additional components, thus reducing cost and complexity of the resulting device 10. Further, by including battery-optimizing techniques, the system-on-a-chip optimally consumes power to fully extend the life of the battery.

Figure 2:
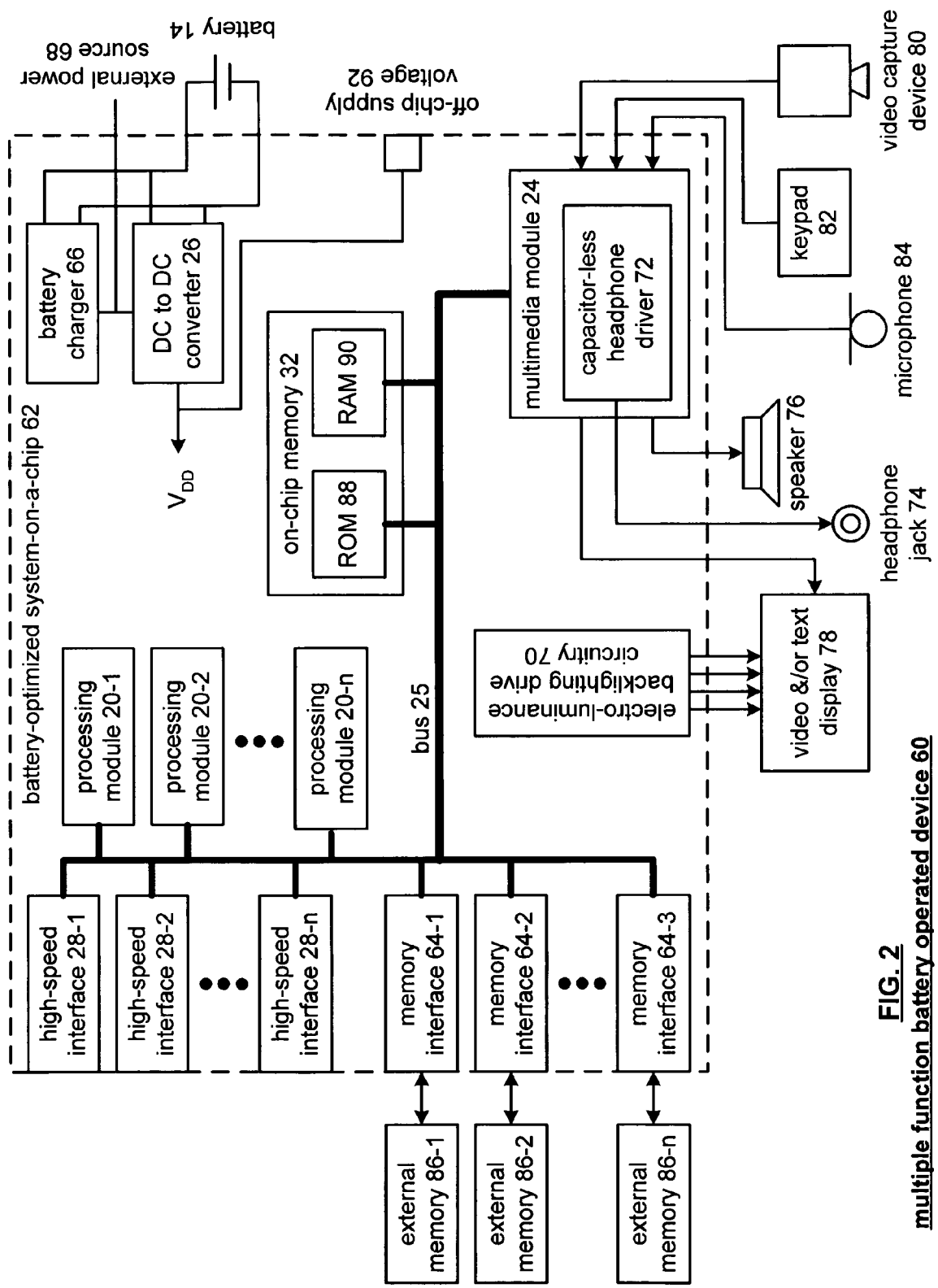
FIG. 2 is a schematic block diagram of another multiple function battery operated device that includes a battery-optimized system-on-a-chip in accordance with the present invention.

FIG. 2 is a schematic block diagram of another multiple function battery operated device 60 that includes a battery-optimized system-on-a-chip 62, a plurality of external memories 86, the battery 14, an external power source 68, a video and/or text display 78, a headphone jack 74, speaker(s) 76 a microphone 84, a keypad 82, and a video capture device 80. The battery-optimized system-on-a-chip 62 includes a plurality of high-speed interfaces 28, a plurality of memory interfaces 64, a plurality of processing modules 30, the DC-to-DC converter 26, a battery charger 66, the on-chip memory 32, the multimedia module 24, and a electro-luminance backlighting drive circuitry 70. The multimedia module 24 includes a capacitor-less headphone driver 72. The on-chip memory 32 includes random access memory (RAM) 90 and read only memory (ROM) 88.

The plurality of high-speed interfaces 28-1 through 28-n allow the system-on-a-chip 62 to be simultaneously coupled to multiple external sources 34. The high-speed interfaces may utilize the same or different interface protocols. For example, all of the high-speed interfaces 28 may utilize a USB interface protocol, an Ethernet interface protocol, a fire-wire interface protocol, a serial/deserial interface protocol, etc. Alternatively, each high-speed interface 28-1 through 28-n may use a different interface protocol. For instance, high-speed interface 28-1 may support a USB interface, high-speed interface 28-2 may support Ethernet, and high-speed interface 28-n may support a fire-wire interface. One or more of the processing modules 30-1 through 30-n coordinates and arbitrates the high-speed interfaces 28 access to The plurality of memory interfaces 64-1 through 64-n allow the system-on-a-chip 62 to be coupled to a plurality of external memory devices 86-1 through 86-n. The external memory devices 86-1 through 86-n may be NAND flash memory devices, NOR flash memory devices, and/or any other type of random access memory devices or read only memory devices. While executing one or more multimedia applications, one or more of the processing modules 30 coordinates the reading and/or writing of multimedia data to and from the external memory devices 86. For instance, one of the external memory devices 86 may store MP3 files for subsequent playback, another external memory device 86, may store video files (e.g., MPEG, JPEG, etc.) for subsequent playback, and another external memory device may store text and/or video graphics relating to operation of the device 60 and/or related to inputted data via the keypad 82, the video capture device 80, and/or one of the external sources 34.

Each of the external memory devices 86 may or may not be compliant with a memory interface standard. As such, the memory interfaces 64 include a flexible topology to accommodate the various types of external memory devices 86 that may be coupled to the system-on-a-chip 62.

The multimedia module 24 is operably coupled to receive input signals 54 from a microphone 84, a keypad 82, and/or a video capture device 80. The video capture device 80 may be a digital camera and/or a digital camcorder that supplies MPEG files, JPEG files, and/or other standardized format for still and/or motion digital images. The multimedia module 24 receives the digital video images from the video capture device 80 and either converts them into the generic format of the system-on-a-chip to produce generic video that are stored either in the on-chip memory 32 and/or in the external memory 86 or provides the digital video images to the bus 25 for storages in the on-chip memory 32 and/or in the external memory 86. One or more of the processing modules 30 coordinates the storing of the digital video images and whether the data will be converted to the generic format or not. The generic format may involve portioning packets of the video image into data words of a size corresponding to the bus width of the processing modules 30, storage word size of the on-chip or off-chip memory, and/or of the bus width of the bus 25.

The multimedia module 24 is also coupled to receive input signals 54 from the keypad 82. The keypad 82 may be a touch-screen pad, a keyboard, voice recognition module, and/or any device that produces text messages. The multimedia module 24 receives the text messages from the keypad 82 and either processes them for display on the video and/or text display 78 or for storage in the RAM 90 and/or in the external memory 86. The processing of the text message may involve routing it to the video and/or text display 78, converting it to the generic format for storing in the RAM 90 or the external memory 86, or rendering it for display (i.e., converting text information into pixel information).

The multimedia module 24 is further coupled to receive input signals 54 from the microphone 84. The multimedia module 24 converts the analog audio input signals from the microphone 84 into digital audio input signals using an encoding scheme, such as pulse code modulation (PCM). The multimedia module 24 provides the digital audio signals to the RAM 90 and/or the external memory 86 for storage under the control of the processing module 30, which is executing an audio recording multimedia application 46. Accordingly, in this mode, the multiple function battery operated device 60 may function as a dictaphone.

The multimedia module 24 is operably coupled to provide analog audio signals to the speaker(s) 76 and/or to the headphone jack 74. The multimedia module 24 may generate the analog audio signals by performing a PCM decoding of digital audio signals stored in the on-chip memory 32 and/or stored in the external memory 86. The multimedia module 24 includes a driver or multiple drivers, to supply the analog audio signals to the speakers 76. The multimedia module 24 also includes the capacitor-less headphone driver 72 to supply the analog audio signals to the headphone jack. The capacitor-less headphone driver 72 reduces the number of external components by eliminating the need for coupling capacitors from the on-chip drivers to the headphone jack, wherein the coupling capacitors enabled level shifting of the analog audio signals from the driver level of 0.9 volts (e.g., AC ground for the left channel and right channel drivers) to 0 volts for the headphones. By reducing the number of required external components, the cost of producing a device 10 is reduced without sacrificing features and/or functionality.

The multimedia module 24 is further coupled to the video and/or text display 78, which may be an electro-luminance backlight display, an LCD display, or any other type of display that displays text, video graphics and/or video images (still or motion). The multimedia module 24 receives digital video data from the on-chip memory and/or the external memory 86 under the control of the processing module 30, which is executing a text and/or video playback multimedia application. Upon receiving the digital video data, the multimedia module 24 converts it into pixel information (e.g., RGB, YUV, YCrCb, etc.), which is provided to the display 78.

If the display 78 is an electro-luminance backlight display, the system-on-a-chip includes the electro-luminance backlighting drive circuitry 70. In general, the electro-luminance backlighting drive circuitry 70 provides the control signals for the power transistors of the electro-luminance backlight display, thus eliminating the need for an extra integrated circuit to generate the control signals. By eliminating the need for an extra integrated circuit, the cost of producing a device 10 is reduced without sacrificing features and/or functionality.

The battery charger 66 is operably coupled to charge the battery 14 when the external source 68 is coupled to the device 10. The external source 68 may be a 5 volt supply that is received via a USB connection to a host computer or other external source having a USB connection. The details of the battery charger 66 are described in pending patent application entitled METHOD AND APPARATUS TO PERFORM BATTERY CHARGING USING A DC-DC CONVERTER CIRCUIT, filed on Jun. 30, 2003 having application Ser. No. 10/675,116, and pending patent application entitled OVER-VOLTABE AND BACKFLOW CURRENT PROTECTION FOR A BATTERY CHARGER, filed Jun. 30, 2003 having application Ser. No. 10/675,101.

Each of the processing modules 30-1 through 30-n may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Further, each of the processing modules may be performing separate multimedia applications and/or co-process a single multimedia application. Such multimedia applications 46 include, but are not limited to, audio playback, audio record, video playback, video record, storing text, displaying text, storing video graphics, file system transfer, and/or displaying video graphics.

The on-chip memory 32 is shown to include ROM 88 and RAM 90. The ROM 88 may store a boot algorithm to initiate the battery-optimized system-on-a-chip 62, video graphics data, and/or any other system level data that should not be overwritten. The RAM 90 may be used as a first and/or second level cache memory for the processing modules 30 and may range from a few hundred kilobits to several hundreds megabits of storage capacity.

Figure 3:
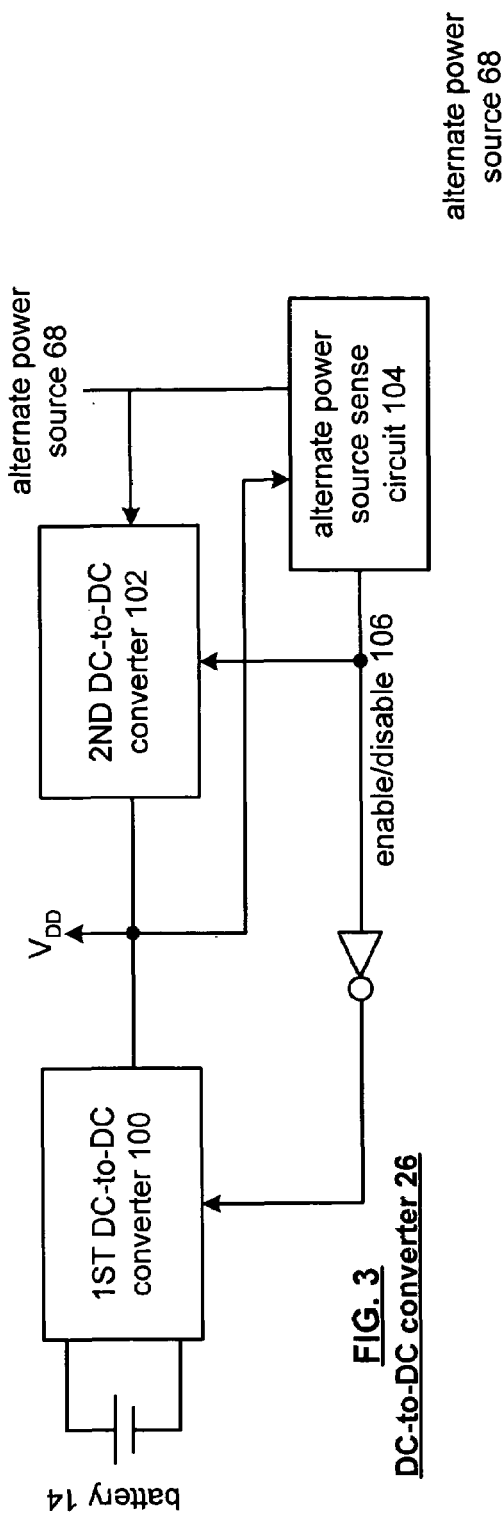
FIG. 3 is a schematic block diagram of a DC-to-DC converter in accordance with the present invention.

FIG. 3 is a schematic block diagram of the DC-to-DC converter 26 that includes a first DC-to-DC converter 100, a second DC-to-DC converter 102, and an alternate power source sensing circuit 104. The first DC-to-DC converter 100 is operably coupled to the battery 14 and to an external inductor (not shown) to produce the supply voltage ($V_{DD}$) when enabled. The second DC-to-DC converter 102 is operably coupled to an alternate power source 68, which may be a 5 volt source provided by a USB connection, to produce the supply voltage when enabled. The alternate power source sense circuit 104 generates an enable/disable signal 106 to indicate when the alternate power source 68 is present. When the alternate power source is present, the enable/disable signal 106 enables the second DC-to-DC converter 102 and disables the first DC-to-DC converter 100. In this manner, the battery 14 is not used to produce the supply voltage, thus its power is conserved.

When the alternate power source is not present, the alternate power source sense circuit 104 generates the enable/disable signal 106 to enable the first DC-to-DC converter 100 and to disable the second DC-to-DC converter 102. The alternate power source sense circuit 104 may determine the presence or absence of the alternate power source 68 by comparing its voltage to that of the supply voltage. If the alternate power source voltage compares favorably to the supply voltage, it is deemed to be present. Note that the first DC-to-DC converter 100 may be a boost converter, a buck converter, a buck-boost converter, etc., while the second DC-to-DC converter may be a buck converter, a boost converter, or a linear regulator.

Figure 4:
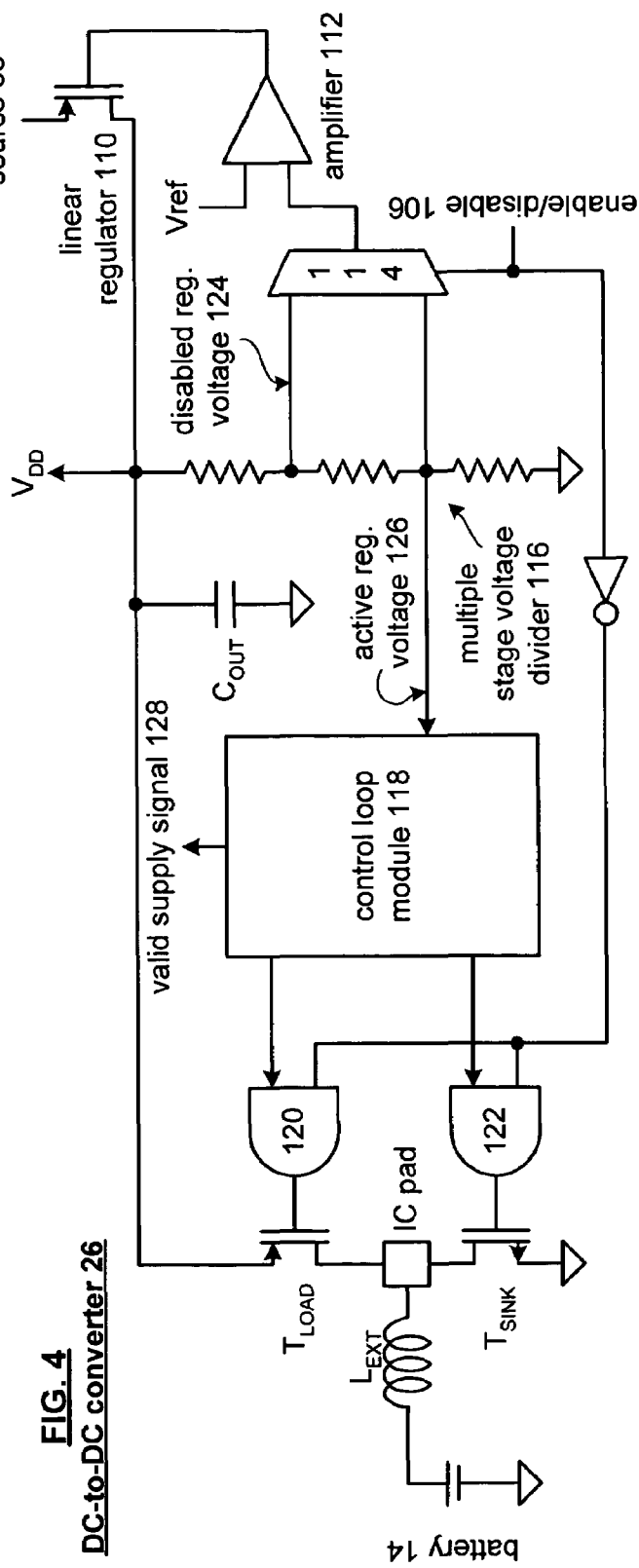
FIG. 4 is a schematic block diagram of another DC-to-DC converter in accordance with the present invention.

FIG. 4 is a schematic block diagram of another DC-to-DC converter 26. In this embodiment, the first DC-to-DC converter 100 is a boost converter and the second DC-to-DC converter 102 is a linear regulator. The first DC-to-DC converter 100 includes an IC pad coupled to an external inductor ($L_{EXT}$) and the battery 14, a sink transistor ($T_{SINK}$), a load transistor ($T_{LOAD}$), a pair of AND gate 122, NAND gate 120, and a control loop module 118. The second DC-to-DC converter 102 includes a linear regulator 110, an amplifier 112, and a multiplexer 114. The first and second DC-to-DC converters share a multiple stage voltage divider 116 and an output capacitor ($C_{OUT}$), which provides the supply voltage.

In operation, when the second DC-to-DC converter is enabled (i.e., the alternate power source is present), the enable/disable signal 106 is in a first state, which passes the active regulation voltage 126 to the amplifier 112. The amplifier 112 compares the active regulation voltage 126 with a reference voltage to produce a regulation signal, which controls the linear regulator to maintain the desired voltage level of the supply voltage. With the enable/disable signal 106 in the first state, a logic low signal to provided to the AND gate 122 and NAND gate 120. As such, the output of AND gate 122 is low, thus keeping the sink transistor off. The output of NAND gate 120 is high, thus keeping the load transistor off. With both of the sink and load transistors off, no power is being drawing from the battery 14. While no power is being drawing from the battery 14, the control loop module 118 is sensing the active regulation voltage 126 and when it reaches a desired level (e.g., 0.9 voltages for a supply voltage of 1.8 volts), the control loop module 118 generates a valid supply signal 128.

When the alternate power source is not present, the enable/disable signal 106 causes the multiplexer 114 to pass the disabled regulation voltage 124 to the amplifier 112. Since the disabled regulation voltage 124 is greater than the active regulation voltage 126, due its positioning on the multiple stage voltage divider 116, the amplifier 112 generates a regulation signal that turns off the linear regulator 110. For example, if the alternate power source 68 is 5 volts, the supply voltage is 1.8 volts, the reference voltage (Vref) is 0.9 volts, and the multiple stage divider 116 is set up to produce 0.9 volts for the active regulation voltage 126 and 1.2 volts for the disabled regulation voltage 124, then the amplifier 112 has 0.9 volts coupled to its inverting input and 1.2 volts coupled to its non-inverting input (neglecting resistors coupled to the inputs of the amplifier). With these inputs, the amplifier 112 produces a maximum positive voltage output, which, for this example, is 5 volts. With 5 volts applied to the gate of the linear regulator 110 and 5 volts coupled to the source of the linear regulator 110, it is off.

With the enable/disable signal 106 in this state, the AND gate 122 and NAND gate 120 pass the signals provided by the control loop module 118. As such, when the sink transistor is active and the load transistor is inactive, energy is building up in the inductor. When the load transistor is active and the sink transistor is inactive, the energy is transferred from the inductor to the output capacitor to produce the supply voltage. The ratio of activating the sink transistor with respect to the load transistor, regulates the supply voltage at its desired level.

Figure 5:
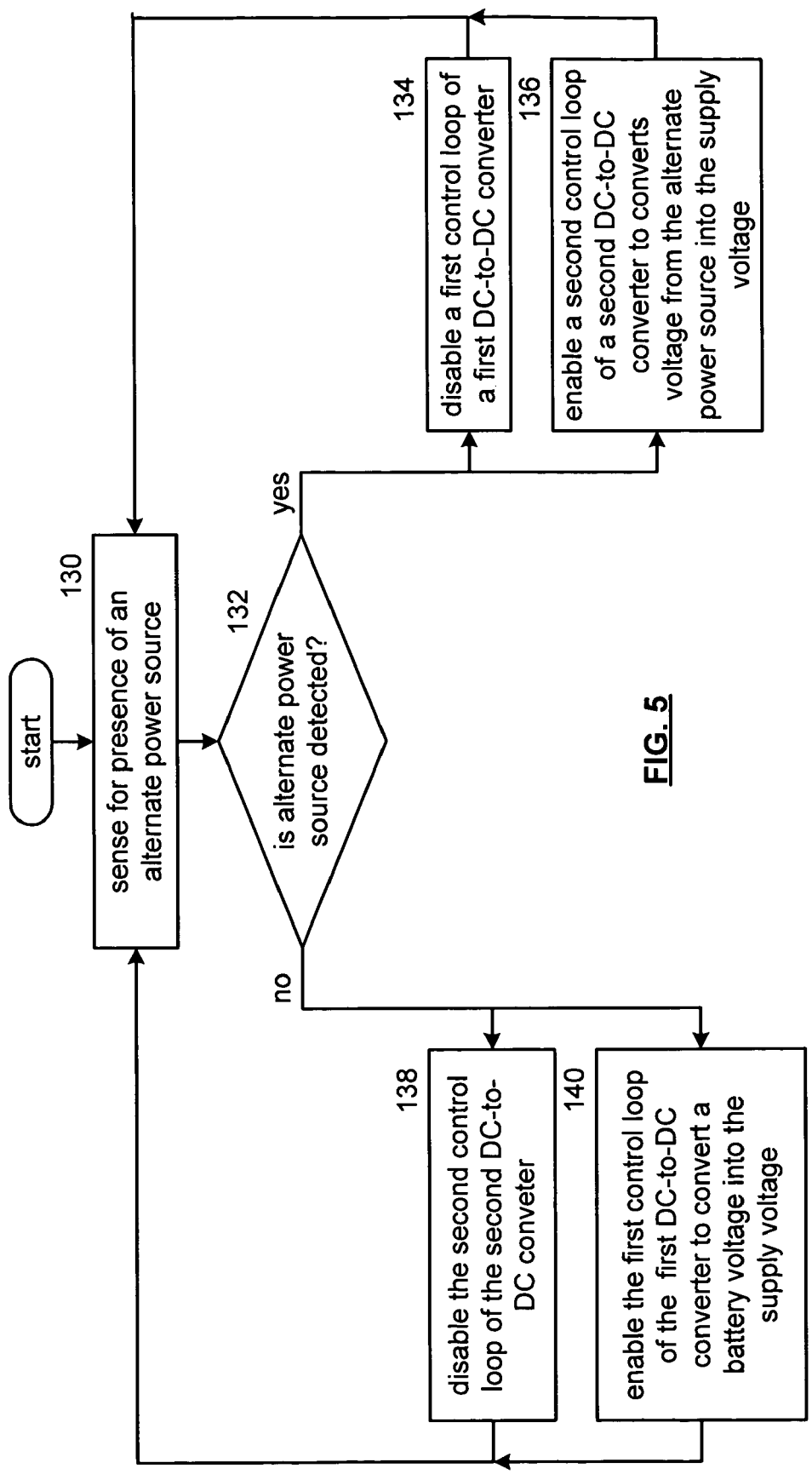
FIG. 5 is a logic diagram of a method for conserving battery power in accordance with the present invention.

FIG. 5 is a logic diagram of a method for conversing battery power for a battery-optimized system-on-a-chip. The process begins at step 130, where sensing for presence of an alternate power source is performed. The process then proceeds to step 132 where a determination is made as to whether the alternate power source is detected. In one embodiment, the detecting the presence of alternate power source may be done by comparing the supply voltage to a voltage on a node operably coupled to the alternate power source; and when the supply voltage compares unfavorably to the voltage on the node, determining that the alternate power source is present.

If the alternate power source is present, the process proceeds to step 134 where a first control loop of a first DC-to-DC converter is disabled. Note that, when enabled, the first DC-to-DC converter converts a battery voltage into a supply voltage. Further note that in one embodiment, the disabling the first control loop may be done by logically disabling a sink transistor of the first DC-to-DC converter; and logically disabling a load transistor of the first DC-to-DC converter.

The process then proceeds to step 136 where a second control loop of a second DC-to-DC converter is enabled. Note that, when enabled, the second DC-to-DC converter converts voltage from the alternate power source into the supply voltage. In one embodiment, the enabling the second control loop may be done by adjusting voltage regulation sensing for the second DC-to-DC converter from a disabled voltage regulation sensing level to an active voltage regulation sensing level to produce an active regulation voltage; comparing a reference voltage with the active regulation voltage to produce a regulation signal; and providing the regulation signal to a linear regulator that is sourced via the alternate power source to produce the supply voltage, wherein linear regulator functions as the second DC-to-DC converter.

If the alternate power source is not present, the process proceeds to step 138 where the second control loop is disabled. In one embodiment, the second control loop may be disabled by adjusting the voltage regulation sensing for the second DC-to-DC converter from the active voltage regulation sensing level to the disabled voltage regulation sensing level to produce a disabled regulation voltage. The process then proceeds to step 140 where the first control loop of the first DC-to-DC converter is enabled, such that the first DC-to-DC converter produces the supply voltage.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for conserving battery power of a battery-powered device. As one of average skill in the art will appreciate, other embodiments may be derived from the teachings of the present invention without deviating from the scope of the claims.

What is claimed is:

1. A method for converting battery power for a battery-optimized system-on-a-chip, the method comprises:
    sensing for presence of an alternate power source by comparing a supply voltage to a voltage on a node operably coupled to the alternate power source, when the voltage on the node compares favorably to the supply voltage, detecting the presence of the alternate power source;
    when the presence of the alternate power source is detected:
        disabling a first control loop of a first DC-to-DC converter, by logically disabling a sink transistor of the first DC-to-DC converter, and logically disabling a load transistor of the first DC-to-DC converter, wherein, when enabled, the first DC-to-DC converter converts battery voltage from a battery into the supply voltage; and
        enabling a second control loop of a second DC-to-DC converter, wherein the second DC-to-DC converter converts voltage from the alternate power source into the supply voltage.

2. The method of claim 1 further comprises:
    when the presence of the alternate power source is not detected:
        maintaining enablement of the first control loop; and
        maintaining disablement of the second control loop.

3. The method of claim 1, wherein the enabling the second control loop further comprises:

adjusting voltage regulation sensing for the second DC-to-DC converter from a disabled regulation voltage to an active regulation voltage;

comparing a reference voltage with the regulation voltage to produce a regulation signal; and providing the regulation signal to a linear regulator that is sourced via the alternate power source to produce the supply voltage, wherein linear regulator functions as the second DC-to-DC converter.

4. The method of claim 3 further comprises:

disabling the second control loop by adjusting the regulation voltage for the second DC-to-DC converter from the active regulation voltage to the disabled regulation voltage.

5. The method of claim 1 further comprises:

when the first control loop is disabled:

monitoring, by the first control loop, the supply voltage produced by the second DC-to-DC converter; and when the supply voltage reaches a near steady-state condition, generating, by the first control loop, a valid supply voltage indication.

6. An apparatus for converting battery power for a battery-optimized system-on-a-chip, the apparatus comprises:

a processing module, operably coupled to:

sense for presence of an alternate power source;

when the presence of the alternate power source is detected:

disable a first control loop of a first DC-to-DC converter by logically disabling a sink transistor of the first DC-to-DC converter, and logically disabling a load transistor of the first DC-to-DC converter, wherein, when enabled, the first DC-to-DC converter converts battery voltage from a battery into a supply voltage; and enable a second control loop of a second DC-to-DC converter, wherein the second DC-to-DC converter converts voltage from the alternate power source into the supply voltage.

7. The apparatus of claim 6, wherein the processing module further functions to:

when the presence of the alternate power source is not detected:

maintain enablement of the first control loop; and maintain disablement of the second control loop.

8. The apparatus of claim 6, wherein the processing module further functions to enable the second control loop by:

adjusting a regulation voltage for the second DC-to-DC converter from a disabled regulation voltage to an active regulation voltage;

comparing a reference voltage with the regulation voltage to produce a regulation signal; and providing the regulation signal to a linear regulator that is sourced via the alternate power source to produce the supply voltage, wherein linear regulator functions as the second DC-to-DC converter.

9. The apparatus of claim 8, wherein the processing module further functions to:

disable the second control loop by adjusting the regulation voltage for the second DC-to-DC converter from the active regulation voltage to the disabled regulation voltage.

10. The apparatus of claim 6, wherein the processing module further functions to:

when the first control loop is disabled:

enable monitoring, by the first control loop, the supply voltage produced by the second DC-to-DC converter; and when the supply voltage reaches a near steady-state condition, generate, by the first control loop, a valid supply voltage indication.

11. The apparatus of claim 6, wherein the processing module further functions to detect the presence of alternate power source by:

comprising the supply voltage to a voltage on a node operably coupled to the alternate power source; and when the voltage on the node compares favorably to the supply, determining that the alternate power source is present.

12. A battery-optimized system-on-a-chip comprises:

a processing core operably coupled to process input digital data and produce therefrom output digital data;

digital interface circuitry operably coupled to provide the input digital data to the processing core and to receive the output digital data from the processing core;

mixed signal circuitry operably coupled to convert input analog signals into the input digital data and to convert the output digital data into output analog signals;

a first DC-to-DC converter, when enabled, operable to convert a battery voltage, operably coupled to an integrated circuit pad of the battery optimized system on a chip, into a supply voltage; and a second DC-to-DC converter, when enabled, operable to convert an alternate power source voltage from an alternate power source into the supply voltage, wherein the supply voltage is provided to at least one of the processing core, the digital interface, and the mixed signal circuit, and wherein the processing core functions to:

sense for presence of the alternate power source by comparing the supply voltage to a voltage on a node operably coupled to the alternate power source, and when the voltage on the node compares favorably to the supply, determining that the alternate power source is present;

when the presence of the alternate power source is detected:

disable a first control loop of the first DC-to-DC converter by logically disabling a sink transistor of the first DC-to-DC converter, and logically disabling a source transistor of the first DC-to-DC converter; and enable a second control loop of a second DC-to-DC converter.

13. The battery-optimized system-on-a-chip of claim 12, wherein the processing core further functions to:

when the presence of the alternate power source is not detected:

maintain enablement of the first control loop; and maintain disablement of the second control loop.

14. The battery-optimized system-an-a-chip of claim 12, wherein the processing core further functions to enable the second control loop by:

adjusting a regulation voltage for the second DC-to-DC converter from a disabled regulation voltage to an active regulation voltage;

comparing a reference voltage with the regulation voltage to produce a regulation signal; and providing the regulation signal to a linear regulator that is sourced via the alternate power source to produce the supply voltage, wherein linear regulator functions as the second DC-to-DC converter.

15. The battery-optimized system-on-a-chip of claim 14, wherein the processing core further functions to:
disable the second control loop by adjusting the regulation voltage for the second DC-to-DC converter from the active regulation voltage to the disabled regulation voltage.

16. The battery-optimized system-on-a-chip of claim 12, wherein the processing core further functions to:

when the first control loop is disabled:
enable monitoring, by the first control loop, the supply voltage produced by the second DC-to-DC converter; and
when the supply voltage reaches a near steady-state condition, generate, by the first control loop, a valid supply voltage indication.

* * * * *